US006795858B1

(12) United States Patent
Jain et al.

(10) Patent No.: US 6,795,858 B1
(45) Date of Patent: Sep. 21, 2004

(54) METHOD AND APPARATUS FOR METRIC BASED SERVER SELECTION

(75) Inventors: Bijendra N. Jain, New Dehli (IN); Keith Mccloghrie, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 810 days.

(21) Appl. No.: 09/750,661

(22) Filed: Dec. 29, 2000

(51) Int. Cl.⁷ ............................................. G06F 15/173
(52) U.S. Cl. ....................... 709/226; 709/238; 709/244
(58) Field of Search ................................ 709/226, 238, 709/244, 102, 105

(56) References Cited

U.S. PATENT DOCUMENTS

| | | |
|---|---|---|
| 5,414,704 A | 5/1995 | Spinney |
| 5,488,412 A | 1/1996 | Majeti et al. |
| 5,506,987 A | 4/1996 | Abramson et al. |
| 5,586,121 A | 12/1996 | Moura et al. |
| RE35,774 E | 4/1998 | Moura et al. |
| 5,818,845 A | 10/1998 | Moura et al. |
| 5,828,655 A | 10/1998 | Moura et al. |
| 5,859,852 A | 1/1999 | Moura et al. |
| 5,872,773 A | 2/1999 | Katzela et al. |
| 5,892,903 A | 4/1999 | Klaus |
| 5,946,047 A | 8/1999 | Levan |
| 5,946,048 A | 8/1999 | Levan |
| 5,950,205 A | 9/1999 | Aviani, Jr. |
| 5,953,335 A | 9/1999 | Erimli et al. |
| 5,956,346 A | 9/1999 | Levan |
| 5,959,660 A | 9/1999 | Levan |
| 5,959,968 A | 9/1999 | Chin et al. |
| 5,959,997 A | 9/1999 | Moura et al. |
| 5,989,060 A | 11/1999 | Coile et al. |
| 6,006,266 A | 12/1999 | Murphy, Jr. et al. |
| 6,016,388 A | 1/2000 | Dillon |
| 6,050,898 A * | 4/2000 | Vange et al. .................. 463/42 |
| 6,052,718 A | 4/2000 | Gifford |
| 6,345,291 B2 * | 2/2002 | Murphy, Jr. et al. ........ 709/208 |
| 6,345,294 B1 | 2/2002 | O'Toole et al. |

FOREIGN PATENT DOCUMENTS

WO    WO98/31107    7/1998

OTHER PUBLICATIONS

Akamai Technologies, Inc. –Global Internet Content Delivery–"How FreeFlow Works," webmaster@akamai.com 1999–2000.

Digital Island, Inc. –e–Business Without Limits–, "Enabling Technologies," http://www.digisle.net. no date.

Internap, "Preferred Collocation Services," http://www.internap.com Copyright© 2001 Internap Network Services Corporation.

(List continued on next page.)

*Primary Examiner*—Krisna Lim
(74) *Attorney, Agent, or Firm*—Beyer Weaver & Thomas, LLP (57) ABSTRACT

Methods and apparatus are provided for selecting a server that can provider content to a client in an optimal manner. A server selection system is coupled to a network node that can identify servers that can provide client reqeusted content. Performance metrics of the servers and their associated priorities are obtained. Servers with metrics that are worse than all the metrics of any other server are optionally eliminated from consideration for best server. Priorities for the metrics are obtained. The metric with the highest priority is applied to analyze the group of servers. The server with the best value for the metric and all servers with metric values falling within a significance window are retained. All others are eliminated from consideration. The other metrics are applied until no metrics remain or only one server remains. If no metrics remain, a best server is identified from the remaining group.

32 Claims, 3 Drawing Sheets

OTHER PUBLICATIONS

Eager et al., "Adaptive Load Sharing in Homogeneous Distributed Systems," IEEE, Transactions on Software Engineering, vol. Se–12, No. 5, May 1986, pp 662–675.

Meyer, et al., Request For Comments No. 2026, entitled, "Generic Routing Encapsulation (GRE)," Jan., 2000, Internet Engineering Task Force, 9 pages.

Mockapetris, P., Request For Comments No. 1034, entitled, "Domain Names —Concepts and Facilities," Nov., 1987, Internet Engineering Task Force, 31 pages.

Information Sciences Institute, Request for Comments No. 793, entitled, "Transmission Control Protocol—DARPA Internet Program—Protocol Specification," Sep., 1981, Internet Engineering Task Force, 49 pages.

David M. Gifford, "Replica Routing," U.S. patent application No. 09/472,964, Filed Dec. 28, 1999, 37 Pages.

Johnson et al., "Dynamic Server Organization," U.S. patent application No. 09/294,837, Filed Apr. 19, 1999, 42 Pages.

Lu et al., "Automatic Network Addresses Assignment and Translation Interference," U.S. Provisional Patent Application No.: 60/160,535, Filed Oct. 20, 1999, 127 Pages.

Lu et al., "Method and Apparatus for Automatic Network Address Assignment," U.S. Provisional patent application No.: 60/178,063, Filed Jan. 24, 2000, 74 Pages.

Johnson et al., "Method and Apparatus for Determining a Network Topology in the Presence of Network Address Translation," U.S. Provisional patent application No.: 60/178,062, Filed Jan. 24, 2000, 32 Pages.

Toole et al., "Fast–Changing Network Status and Load Monitoring and Feedback," U.S. Provisional patent application No.: 60/177,985 Filed Jan. 25, 2000, 20 Pages.

Kirk Johnson, "A Method and Apparatus for Minimalist Approach to Implementing Server Selection," U.S. Provisional patent application No.: 60/177,415, Filed Jan. 21, 2000, 39 Pages.

* cited by examiner

METHOD AND APPARATUS FOR METRIC BASED SERVER SELECTION

BACKGROUND OF THE INVENTION

The present invention relates to selecting a server based on multiple metrics. More particularly, the present invention provides a method and system for using metrics and significance windows for locating an optimal content server. The frame of reference for the present invention is a network node where multiple servers for the same content can be identified. This network node may be a system collocated with a domain name server identifying multiple IP addresses for a given domain name.

A network user can often retrieve identical content from a number of mirror sites. Content is often distributed onto mirroring sites across a network such as the Internet in order to give users optimal access to the information. A number of techniques have been used to select a server that can best provide the content to the user.

One method gives much of the discretion to the user. Users wishing to download a piece of software may be directed to select a server location closest to their own location. Several problems arise out of this technique. Geographic proximity may not be equivalent to network proximity. Two cities may neighbor each other geographically, but the cities may not have a direct network connection. Network traffic may flow through a geographically distant third city. Alternatively, the network lines connecting the two neighboring cities may have limited bandwidth, while the lines connected to the distant third city may have bandwidth to spare.

This method does not take into account server loads. A nearby, but overloaded, server may not be able to provide content as quickly as a distant server with minimal load. This method also does not consider dynamic network traffic loads. One route may be optimal at a particular time of day, while suboptimal at others times.

Some techniques for identifying a best server employ systems at a primary domain name server. When a user requests particular content, these systems interact with the primary domain name server to identify a content server. The system identifies the best content server and then returns the IP address of that server as part of its DNS reply. These systems may select a server from a list of identical servers randomly. This works to prevent any particular content server from carrying a disproportionate load of network traffic. This system may balance server load across a list of content servers, but it does not assure that the user receive service from a content server that would provide the optimal response. In fact, it does not even prevent the user from receiving service from a content server that would provide the slowest response. This system may in fact worsen loads at already congested content servers. The random number generator for the system may exhibit non-random characteristics, and still direct a disproportionate amount of traffic towards particular content servers.

Other systems have incorporated metrics into their determination of what constitutes an optimal server for providing content to a particular user. These metrics include round trip time, server load, drop rate, available bandwidth, administrative distance, number of hops, and whether or not a server is in a particular subnetwork. The round trip time refers to the total time a packet takes to reach its destination and return to its original source location. Server load corresponds with resources such as processing and memory capacity available on a content server. Drop rate gives the percentage of packets dropped during a single round trip. Administrative distance incorporates the idea that it may be less expensive to travel across network nodes that are owned by the user's service provider than to travel across third party owned ones.

Some of these systems rely on one particular metric to determine an optimal server. However, no single metric is the key to determining what server can best provide content to a particular user. For example, the round trip time may seem to be key to providing the optimal server, but when the load for the server with the fastest round trip time is near capacity, the server's response time may be equal or greater than the network transmission time. Once a server reaches capacity, the performance drop off can be significant. Alternatively, TCP/IP does not function well if the drop rate is above 10%. The round trip time for a single packet may be fast when the drop rate is 15%, but the need to wait for the retransmission of lost packets results in data transmission at a much slower effective rate. From a different vantage point, a particular server may not have the best value for any particular metric, but it still may be the best server when all metrics are considered.

Combinations of metrics have been pursued as a possible solution to a finding an optimal server. Several metrics can be combined into a single metric by assigning weights to each measure. The sum of these metrics multiplied by a weighting factor can yield a composite metric. The composite metrics of the servers can then be sorted to identify an optimal server. However, assigning weighting factors to these metrics is at best an inexact science. It can be extremely difficult to assign weights to particular metrics, particularly when the weighting of the metric should not necessarily vary linearly.

For example, response time as a function of server load can vary exponentially. When the server has processing and memory resources to spare, server load should only be a small part in the determination of what the optimal server should be. The round trip time should be a more important consideration when server load is low. However, when a server is running low on resources, server load should be a much more important consideration. Unfortunately, this phenomenon can not easily be expressed as a linear equation. A higher order equation is required. Determining what order equation this composite metric should be based on and identifying the appropriate multipliers is an extremely difficult determination, especially when considering the variability of metrics. One set of multipliers may be appropriate for certain types of data, while others may be more appropriate for a particular set of content servers. Determining multipliers for higher order composite metric equations is not a simple proposition.

Another technique for increasing the efficiency with which data requests are serviced is described in commonly assigned, copending U.S. patent application Ser. No. 09/606, 418 for WIDE AREA LOAD BALANCING OF WEB TRAFFIC filed Jun. 28, 2000, the entirety of which is incorporated herein by reference for all purposes. The copending application describes the Boomerang process where in a specific embodiment, each site with an IP address corresponding to a domain name is requested to respond to a Domain Name System (DNS) query. The first server to complete a response through the network lines is deemed to be the optimal server. The Boomerang process identifies the server with the lowest network delay between itself and the DNS server at the moment of transmission.

This presents an accurate depiction of the round trip time at the moment of transmission. However, the same disadvantages for using only one metric to determine an optimal content server may apply here as well. The fact that a server may be close to its maximum load is ignored. Packet drop rate and administrative costs are also not directly considered. The content server that responds to the DNS query first is selected, regardless of how likely a series of packets would be able to arrive at the DNS server through the service provider's own network nodes.

Each of the currently available techniques for selecting a server to provide content to a user at the best possible rate has its own disadvantages with regard to at least some of the desirable characteristics of server selection systems. It is therefore desirable to provide a system for selecting a content server that exhibits desirable characteristics as well or better than the technologies discussed above.

SUMMARY OF THE INVENTION

According to the present invention, a method and apparatus are provided to select from a group of servers a particular server that can provide content to a client in an optimal manner.

Certain network nodes contain the addresses of a group of servers that can provide the same content. In one embodiment, such a network node is a DNS server. When a client submits a domain name to the DNS server, the present invention selects the server corresponding to the domain name that can best provide content to the client. The server selection system of the present invention may be integrated into DNS server, or may be collocated with a DNS server. The server selection system identifies a set of available content servers distinct from the name server and obtains performance metrics for each of these servers. These performance metrics may be obtained in a variety of ways, and can be determined dynamically or referenced from memory or external storage. These performance metrics include round trip time, server load, drop rate, administrative cost, as well as any other system administrator defined measurements.

In one embodiment of the present invention, as soon as the server selection system identifies values for these metrics, it can optionally remove a particular server when there exists another server that is better with respect to every metric. Note that the terms best, better, optimal, and worst are subjective and can be defined on a per-metric basis.

The server selection system also allows the priorities of given metrics to be defined. A system or network administrator can rank the metrics in order of importance. According to specific embodiments, significance windows of varying sizes can be assigned to each metric. The servers can be first analyzed based on the most important metric and its significance window.

The servers that fall outside of this significance window can be eliminated from consideration. The remaining servers are then analyzed based on a second metric. The optimal server based on this metric as well as servers falling within the significance window remain available servers. The others can be dropped. The process can be repeated for each of the remaining metrics until either no metrics remain, or only one server remains. The address of the selected server is returned to the user as the optimal content server.

One aspect of the invention provides a method for selecting a server from a group of servers to provide content to a client in an optimal manner. The method may be characterized by the following sequence: (1) for each server in the group of servers, obtaining values of at least a first performance metric and a second performance metric, wherein the performance metrics correspond with the characteristics of transmission between the servers and network nodes associated with the client; (2) applying a first significance window defining a range of acceptable values of the first performance metric and removing from consideration those servers in the group having poor values of the first performance metric, which fall outside the significance window; (3) applying a second significance window to the servers remaining after applying the first significance window, the second significance window defining a range of acceptable values of the second performance metric; and (4) identifying the best server from among any remaining servers lying within the second significance window.

Multiple significance windows can be applied. Each metric can have a significance window associated with it. If multiple servers remain after the significance windows have filtered out servers with low performance metric values, an optimal server can be selected from the group of remaining servers. One method of selecting this remaining server may be to simply select the server with the optimal final metric value.

Another aspect of the invention provides an apparatus for selecting a server from a group of servers to provide content to a client in an optimal manner. The apparatus may be characterized by the following features: (1) memory configured to store, at least temporarily, values of at least a first performance metric and a second performance metric, wherein the metrics are associated with the characteristics of transmission between the servers and network nodes associated with the client; and (2) one or more processors coupled with the memory, wherein the processors are configured or designed to apply a second significance window to a list of servers falling inside a first significance window and to identify the best server from among any remaining servers lying within the second significance window, wherein the first significance window is defined by a range of acceptable values of the first performance metric for removing from consideration those servers which fall outside the first significance window and the second significance window is defined by a range of acceptable values of a second performance metric for removing from consideration those servers which fall outside the second significance window.

Another aspect of the invention pertains to computer program products including a machine readable medium on which is stored program instructions, tables or lists, and/or data structures for implementing a method as described above. Any of the methods, tables, or data structures of this invention may be represented as program instructions that can be provided on such computer readable media.

A further understanding of the nature and advantages of the present invention may be realized by reference to the remaining portions of the specification and the drawings.

DETAILED DESCRIPTION OF THE PREFERRED EMBODIMENTS

Figure 1:
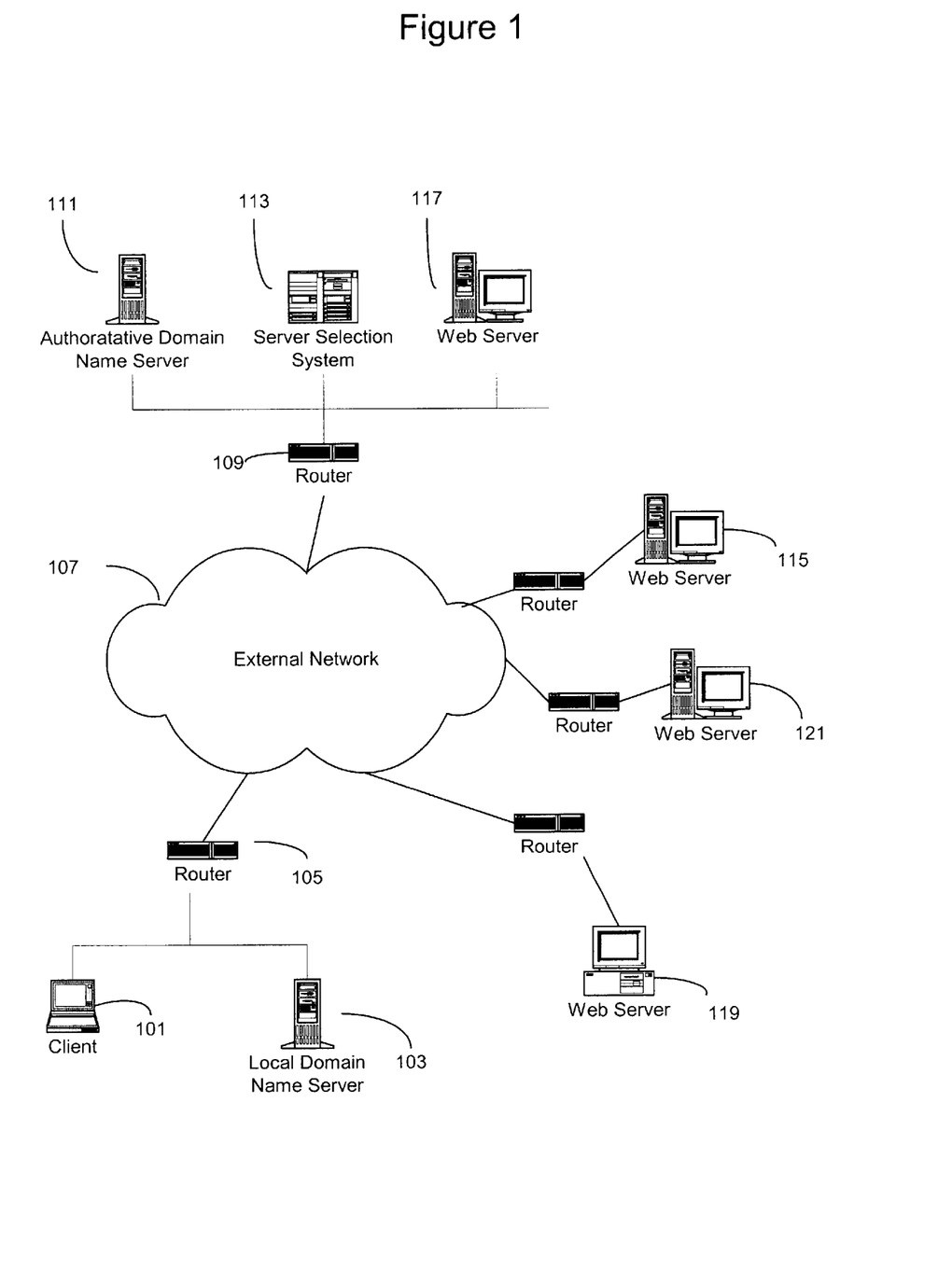
FIG. 1 is a block diagram showing one possible network configuration that may be used in implementing the present invention.

This invention pertains to methods and systems for selecting a best server from a group of servers that can provide similar content to a client. FIG. 1 presents a network level view of one situation where the present invention may be applicable. As shown, various nodes and sites communicate through an external network 107. The external network 107 in this situation can be the Internet, or it can be a variety of other networks with different architectures, protocols, etc. A client 101 issues a request for content using on a specific domain name. This triggers a DNS resolve. The client 101 is configured to send its DNS request to a local name server 103.

The local DNS server 103 of the client 101 checks its local memory to determine whether the domain name is already associated with an address it has stored locally. If it determines that the address is not stored locally or if it is stored locally but a predetermined period of time for the mapping between the address and the domain name has elapsed, the local DNS server issues a recursive DNS request for the address associated with the domain name. This request is routed through external network 107 by routers 105 and 109, among others, and arrives at an authoritative DNS server 111.

Typically, though not necessarily, an apparatus for selecting a content server is co-located with a name server. Name servers are typically the network entities with the best ability to determine when a particular domain name has multiple IP address. Name servers are also responsible for forwarding correct IP addresses to clients.

Generally, apparatus or logic for selecting a content server is referred to herein as a "server selection system." In FIG. 1, server selection system 113 is co-located with authoritative name server 111. In addition, server 111 is authoritative for four separate content servers: server 115, server 117, server 119, and server 121.

In one embodiment of the invention, if the authoritative DNS server finds that there is more than one address for the particular domain name, the authoritative DNS server can refer the local DNS server to the server selection system 113 for DNS resolution. In another embodiment, the authoritative DNS server 111 does not check its own memory for address resolution prior to referring a local DNS server 103 to the server selection system 113. The server selection system can be implemented in any suitable computation device or network node. Examples of suitable apparatus that can be adopted to implement the present invention include the DistributedDirector 2500 or DistributedDirector 4700, both available from Cisco Systems, San Jose, California. Alternatively, the server selection system 113 can be directly integrated into the authoritative DNS server 111. The server selection system 113 determines whether multiple servers can provide the content that the client 101 seeks.

The server selection system 113 may determine that each of servers 115, 117, 119, and 121 can provide the content the client seeks. Servers 115 and 121 may be mirror sites carrying identical content. Upon determining the addresses of these servers, the server selection system 113 obtains the values for each of the metrics associated with each of the servers 115 and 117. These values may be dynamically calculated by the server selection system 113 or by a separate network node. Some metrics may be stored in the memory of the server selection system 113. Network administrator defined metrics can also be used. As part of this invention, the server selection system 113 can then rank the metrics and obtain significance windows for each metric. Servers that do not fall within the significance windows of each metric analyzed by priority are no longer considered available servers. After metrics and significance windows have been applied, the server selection system 113 can determine a server that can best provide content to the client.

The terms best, optimal, etc. are terms that may have different meanings for different network administrators. A best server or a server providing content in an optimal manner may simply mean the server that can provide the client 101 with the fastest access available to particular content. A best server may also mean a server that can provide the most reliable connection. In a different embodiment, a best server may not even be a best server from the client's standpoint, but may be a best server from the service provider's standpoint. Usage of one server may be less expensive for the service provider than the access of another. Alternatively, a best server may mean that the client 101 should access a server 117 that would optimize traffic patterns and work best for all network users as a whole.

The server selection system 113 takes the address of this "best" server and returns the address to the client's local DNS server 103. The client's local DNS server 103 returns the address to the client 101. The client 101 can then connect to the web server having the returned address (e.g. web server 117).

In this embodiment of the present invention, it should be noted that this entire process of using the server selection system 113 is completely transparent to the client 101. The client 101 does not need to select the server the client believes is best. In fact, the client does not even need to know that multiple servers carry the content the client 101 has requested. The client 101 connects to the server selected by the server selection system 113 entirely unaware of the process the server selection system 113 has undergone.

Figure 2:
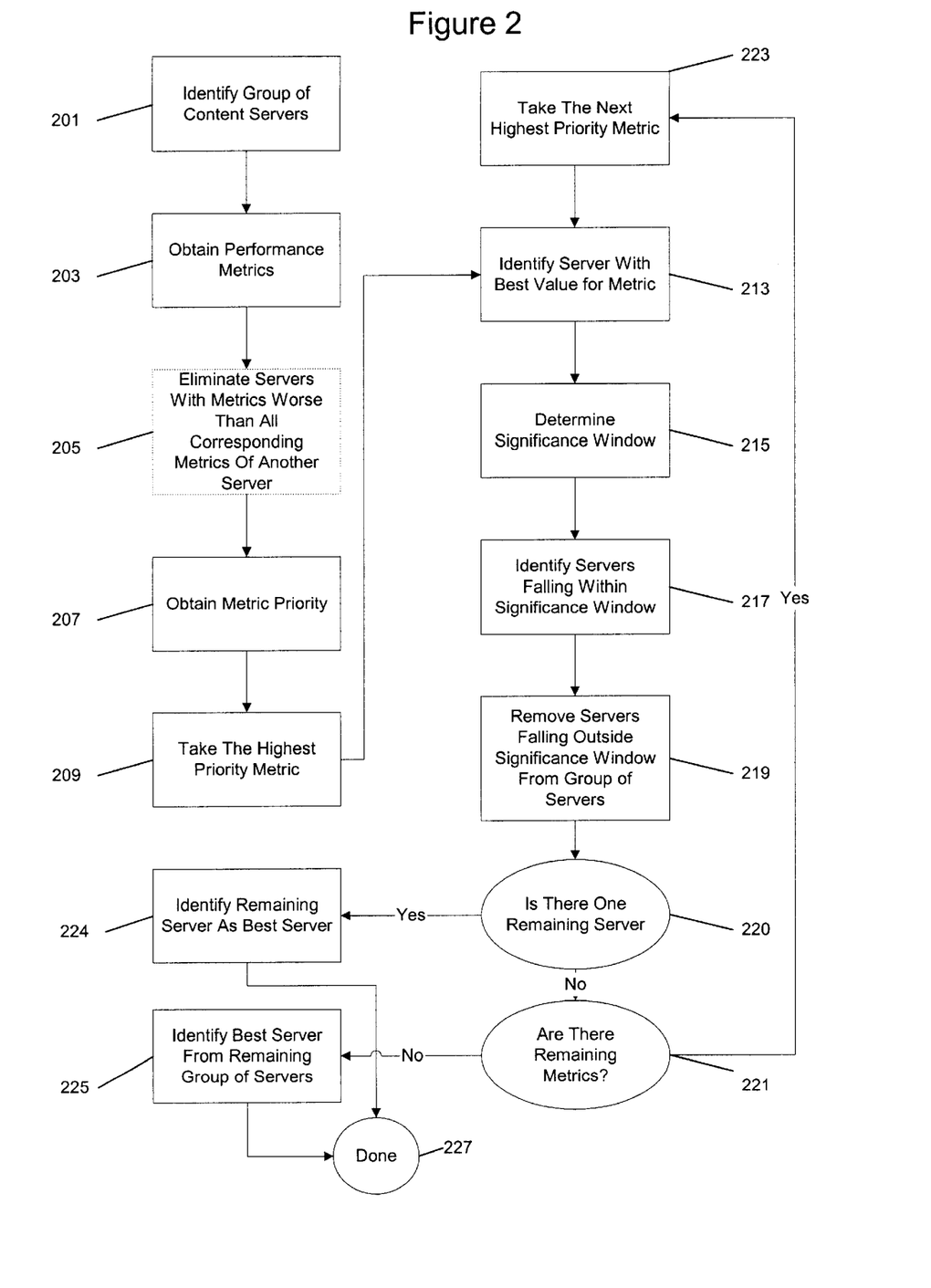
FIG. 2 is a process flow diagram illustrating selecting an optimal server according to one embodiment of the present invention.

FIG. 2 is a process flow diagram describing one embodiment of the method for selecting a best server. A server selection system 113 identifies a group of content servers at 201 that can provide the material the client has requested. The server selection system can then employ performance metrics for each of these servers at 203. Instructions for executing some of these metrics may be stored statically in memory. As mentioned above, examples of performance metrics include round trip time, server load, drop rate, available bandwidth, administrative distance, number of hops, and whether or not a server is in a particular subnetwork. A variety of network administrator defined metrics can also be used.

Round trip time can be determined by using a level three message such as a ping message, which measures the time required for an automatic response to a request. A level three communication can correspond to Layer 3 of the OSI reference model, also known as the IP or network layer. Transmissions at this level typically provide connectivity and path selection between two end systems. Level three is the layer at which routing usually occurs. A level 3 communication can also correspond to the path control layer of the SNA model.

Traceroute IP packets also allow measurement of round trip time, but with more detailed path characterization than a ping message. Traceroute packets contain a TTL value representing the maximum hop count that is set by the sender and decremented at each intermediate router. If the value reaches zero, the packet is discarded by the intermediate router and the router transmits an ICMP time exceeded error indication packet back to the sender. Traceroute packets with incrementally increasing TTL values are sent until the packet reaches its destination. The sender then can determine the time required for each hop and the corresponding delay. "Pathchar" operates in a similar manner but can gather more extensive information. Pathchar is described in "Pathchar: How to Infer the Characteristics of Internet Paths" by Van Jacobson, April 1997, available from the Mathematical Sciences Research Institute, which is herein incorporated by reference for all purposes. Pathchar employs performance metrics of each network node along a path. It again uses the ICMP protocol's time exceeded response to dropped packets. Pathchar sends a series of packets of various sizes to each hop. It uses knowledge about earlier hops and the round trip time distribution to this hop to assess bandwidth, drop rate, latency, and queue characteristics across this link.

While the server selection system can determine values for performance metrics using various tools such as ping, traceroute, pathchar, mtrace, etc., requiring that the server selection system conduct performance measurements prior to mapping each domain name to a particular address can lead to high overhead. Excessive overhead may even eliminate the gains achieved by selecting an optimal server. It may be useful to store some of these network characteristics in the memory of the server selection system. Performance metrics can be periodically updated instead of measured in real-time. However, performance metrics change, and storing metrics in memory creates the risk that the network metrics will be obsolete by the time they are accessed. The use of significance windows takes into account the time variation of each performance metric. The significance windows do not require specific values. Instead they allow for a range of values in any given performance metric.

As noted above, performance metrics can be measured using a variety of different tools. Values obtained for performance metrics can be updated periodically or determined dynamically. The network administrator may also set performance metrics to include parameters such as usage of a third party network.

Once the performance parameters for each server are determined, the server selection system can optionally eliminate servers with metrics that are all individually worse than another server's metrics at 205. This step is not necessary to practice the present invention.

At 207, the server selection system should obtain the priorities for each of the metrics. These priorities can be set by a network administrator based on the importance of each performance metric in determining a best server. In one embodiment of the present invention, a network administrator may want to set server load as the most important metric at 209. A best server should not have a server load of greater than 85% for example.

The server selection system can take the server with the lowest load at 213 and determine the significance window at 215. The significance window will preserve all servers with values close enough to the best measure value. In one embodiment, this window may require including all servers with loads no greater than 85%. The servers falling within this window are categorized into a group of acceptable servers at 217.

Servers falling outside of this window can be eliminated from consideration at 219. If there are remaining metrics at 221, the next highest priority metric is taken at 223. In one embodiment of the invention, the next highest metric priority may be drop rate. From the group of servers determined at 217, the server with the lowest calculated drop rate is determined at 213. A significance window is determined for the particular metric. It should be noted that the present invention does not require that the steps of this process be performed in any specified sequence. For example, in one embodiment of the invention, significance windows can be determined in advance of identifying servers, or even preset by a network administrator. This significance window can be calculated in a variety of ways. The server selection system can then identify servers falling within this significance window at 217, and can remove from consideration all servers falling outside the significance window at 219.

The cycle can then continue until there are no remaining metrics at 221. In another embodiment, the cycle can continue until only one server remains after applying the significance windows. If the server selection system identifies at 220 that only one server remains, it identifies the reamining server as the best server at 224 and has completed processing at 227. The address of the best server is sent to the client's local DNS server. If a group of servers remain, the server selection system can select the best server based on the best value for any one given metric at 225, as all of the server remaining have metric values that fall at least within the significance windows of each metric.

As noted above, significance windows can be calculated in a number of different ways. In one embodiment of the present invention, significance windows can be preset by a network administrator. The drop rate metric for example would include the server with the best drop rate metric along with any server with better than a 10% rate, for example. The significance window for the round trip time can be set to 50 ms, if the network administrator estimates that the measurement error is on the order of 20 ms. These significance windows must be catered to the individual characteristics of a particular network.

Two additional aspects may be considered. Changes over time in the value of a metric and errors in measuring metric values should tend to increase the size of the significance window to account for the inaccuracies.

According to specific embodiments, the significance window can be set by multiplying the difference between the highest and lowest metric values with a multiplier. In another embodiment, this significance window can be bound by minimum and maximum allowable values determined by an administrator.

Significance windows can also be determined by the use of percentages or percentiles. A network administrator may elect to retain those servers that fall within the top 25% with respect to a first metric. The other servers are dropped. This can be used in conjunction with significance windows calculated in different manners for each metric. In a specific embodiment of the present invention, three metrics are used and ranked as follows: server load, round trip time, and drop rate. The server load significance window is a fixed size window that takes the server with the best measurement value and all servers with server loads of less than 85%.

Assuming several servers fall outside this window, the remaining servers are rated according to round trip time. The significance window for this metric can be based on the server with the fastest round trip time. Any server that has a round trip time less than average of all of the round trip times for the remaining servers falls within this significance window. All others are eliminated from consideration. The final drop rate metric can be based on percentiles, where the servers with drop rate metrics within the top 25% are retained.

Figure 3A:
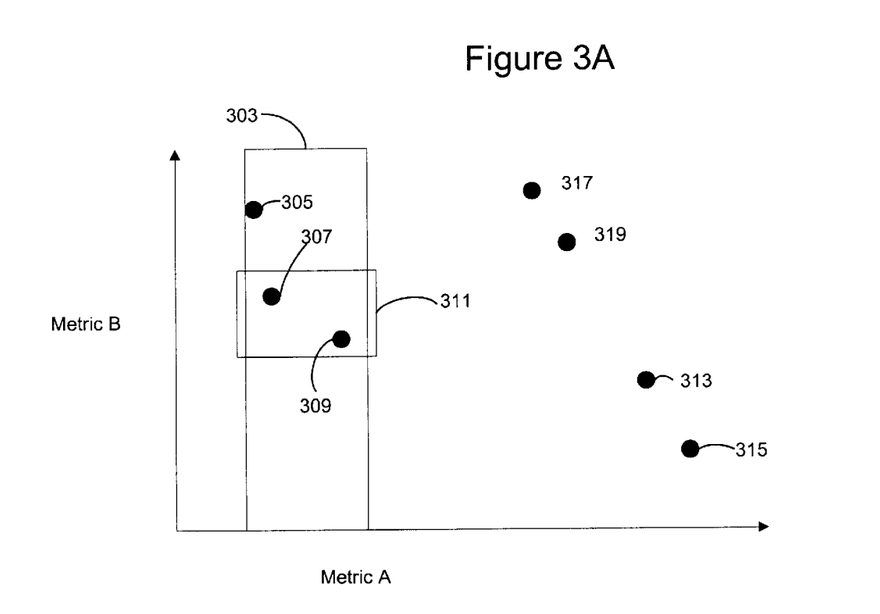
FIGS. 3A and 3B are diagrams depicting arrangements of metric priorities and significance windows.
Figure 3B:
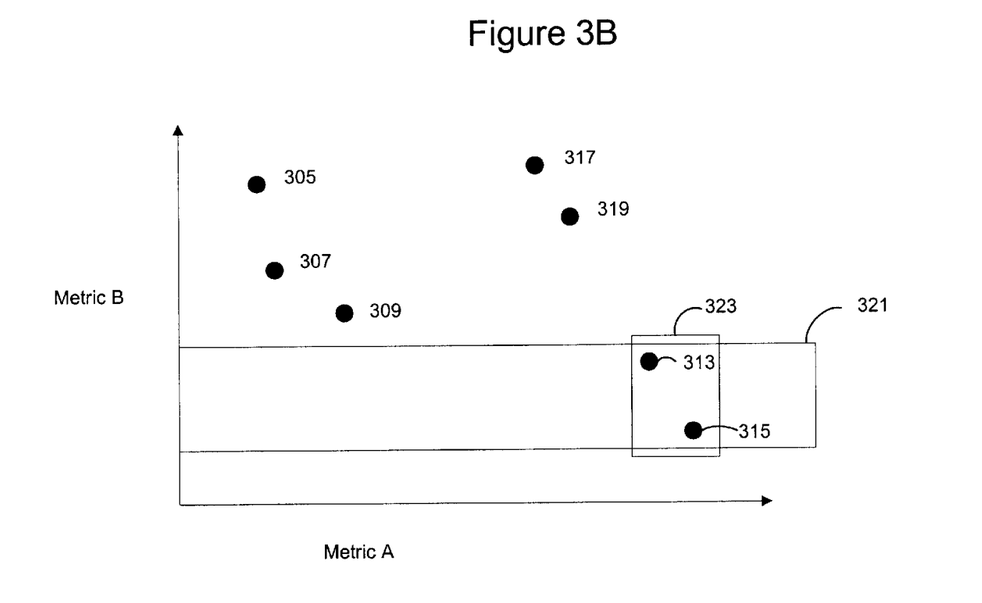

FIGS. 3A and 3B show the significance of ranking metrics. In the embodiment shown in FIG. 3A, metric A has a higher priority than metric B. Server 305 is determined to have the best value of metric A. Servers 307 and 309 are determined to fall within a given significance window 303 of server 305. Servers 317, 319, 313, and 315 are eliminated from consideration. Upon applying metric B, server 309 is determined to have the best value of metric B of all remaining servers 305, 307, and 309. Server 307 falls within the significance window 311 of metric B and server 305 is eliminated from consideration. Server 307 or 309 can be identified as the best server either by applying metric A or B, a third metric, or some other consideration. In any case, both servers 307 and 309 provide excellent performance characteristics based upon the selection of metric A as the most significance criteria.

In another embodiment, metric B can be ranked higher in importance than metric A. Server 315 is determined to have the best metric B value, and the significance window 321 includes server 313. Upon applying metric A, server 313 is determined to have the best value and server 315 is included in the significance window 323. Either of these servers can be selected as the best server. The ranking of metrics can provide significantly different results.

Information and program instructions may be employed to implement the systems/methods described herein. The present invention can relate to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as that produced by a compiler, and files containing higher level code that may be executed by the computer using an interpreter.

While the invention has been particularly shown and described with reference to specific embodiments thereof, it will be understood by those skilled in the art that changes in the form and details of the disclosed embodiments may be made without departing from the spirit or scope of the invention. For example, the embodiments described above may be implemented using firmware, software, or hardware. Moreover, embodiments of the present invention may be employed with a variety of communication protocols and should not be restricted to the ones mentioned above. The server selection system and its accompanying DNS server have a variety of embodiments which include an server selection system coupled with a DNS server. Therefore, the scope of the invention should be determined with reference to the appended claims.

What is claimed is:

1. A method for selecting a server from a group of servers to provide content to a client in an optimal manner, the method comprising:

for each server in the group of servers, obtaining values of at least a first performance metric and a second performance metric, wherein the performance metrics correspond with the characteristics of transmission between the servers and network nodes associated with the client;

applying a first significance window defining a range of acceptable values of the first performance metric and removing from consideration those servers in the group having poor values of the first performance metric, which fall outside the significance window;

applying a second significance window to the servers remaining after applying the first significance window, the second significance window defining a range of acceptable values of the second performance metric; and identifying the best server from among any remaining servers lying within the second significance window.

2. The method of claim 1, further comprising:

obtaining values of a third performance metric for each server in the group of servers;

applying a third significance window to any remaining servers lying within the second significance window, the third significance window defining a range of acceptable values of the third performance metric; and identifying the best server from among any remaining servers lying within the third significance window.

3. The method of claim 1, further comprising identifying the group of servers that can each serve the same content.

4. The method of claim 1, further comprising:

removing from consideration one or more poor servers from having poorer values of all performance metrics under consideration than at least one other server in the group of servers.

5. The method of claim 4, wherein the poor server is removed prior to applying the first significance window.

6. The method of claim 1, wherein the first performance metric is selected from the group consisting of round trip time, drop rate, server load, available bandwidth, administrative distance, monetary cost, number of hops, and use of third party systems.

7. The method of claim 1, wherein the first performance metric is a measure of round trip time and the second performance metric is selected from the group consisting of available bandwidth, server load, and drop rate.

8. The method of claim 1, further comprising calculating at least one of the first significance window and the second significance window.

9. The method of claim 8, wherein calculating the at least one of the first and second significance windows comprises:

calculating the difference between the best and worst metric values for available servers; and identifying a multiplier, wherein the product of the multiplier and the difference between the best and worst metric values yields the significance window.

10. The method of claim 8, wherein calculating the at least one of the first and second significance windows comprises:

providing an upper and lower bound for a significance window;

calculating the difference between the best and worst metric values for available servers;

identifying a multiplier; and calculating the product of the multiplier and the difference, wherein the significance window is the median of the upper bound, lower bound, and the product of the multiplier and the difference.

11. The method of claim 8, wherein at least one of the first and second significance windows has a constant size.

12. The method of claim 8, wherein calculating the at least one of the first and second significance windows comprises:

identifying a percentage of servers with metric values closest to an identified optimal value.

13. A computer program product comprising a machine readable medium on which is provided program instructions for selecting a server from a group of servers to provide content to a client in an optimal manner, the instructions encoding a method comprising:

for each server in the group of servers, obtaining values of at least a first performance metric and a second performance metric, wherein the performance metrics correspond with the characteristics of transmission between the servers and network nodes associated with the client;

applying a first significance window defining a range of acceptable values of the first performance metric and removing from consideration those servers in the group having poor values of the first performance metric, which fall outside the significance window;

applying a second significance window to the servers remaining after applying the first significance window, the second significance window defining a range of acceptable values of the second performance metric; and identifying the best server from among any remaining servers lying within the second significance window.

14. The computer program product of claim 13, wherein instructions further comprise calculating at least one of the first significance window and the second significance window.

15. The computer program product of claim 14, wherein instructions for calculating the at least one of the first and second significance windows comprises:

calculating the difference between the best and worst metric values for available servers; and identifying a multiplier, wherein the product of the multiplier and the difference between the best and worst metric values yields the significance window.

16. The computer program product of claim 14, wherein instructions for calculating the at least one of the first and second significance windows comprises:

providing an upper and lower bound for a significance window;

calculating the difference between the best and worst metric values for available servers;

identifying a multiplier; and calculating the product of the multiplier and the difference, wherein the significance window is the median of the upper bound, lower bound, and the product of the multiplier and the difference.

17. The computer program product of claim 14, wherein instructions for calculating the at least one of the first and second significance windows comprises:

identifying a percentage of servers with metric values closest to an identified optimal value.

18. An apparatus for selecting a server from a group of servers to provide content to a client in an optimal manner, the apparatus comprising:

memory configured to store, at least temporarily, values of at least a first performance metric and a second performance metric, wherein the metrics are associated with the characteristics of transmission between the servers and network nodes associated with the client;

one or more processors coupled with the memory, wherein the processors are configured or designed to apply a second significance window to a list of servers falling inside a first significance window and to identify the best server from among any remaining servers lying within the second significance window, wherein the first significance window is defined by a range of acceptable values of the first performance metric for removing from consideration those servers which fall outside the first significance window and the second significance window is defined by a range of acceptable values of a second performance metric for removing from consideration those servers which fall outside the second significance window.

19. The apparatus of claim 18 further comprising:

memory further configured to store values of a third performance metric for each server in the group of servers, wherein the one or more processors are further configured or designed to apply the third significance window to a list of servers falling inside both the first and second significance windows and to identify the best server from among any remaining servers lying within the third significance window and wherein the third significance window is defined by a range of acceptable values of a third performance metric for removing from consideration those servers which fall outside the third significance window.

20. The apparatus of claim 18, wherein the processors are further configured or designed calculate at least one of the first significance window and the second significance window.

21. The apparatus of claim 20, wherein the processors are configured or designed to calculate the difference between the best and worst metric values for available servers, and identify a multiplier, wherein the product of the multiplier and the difference between the best and worst metric values yields the significance window.

22. An apparatus for selecting a server from a group of servers to provide content to a client in an optimal manner, the apparatus comprising:

memory containing values of at least a first performance metric and a second performance metric, wherein the metrics are associated with the characteristics of transmission between the servers and network nodes associated with the client;

one or more processors coupled with the memory, wherein the processors are configured or designed to perform the following operations:

applying a first significance window defining a range of acceptable values of the first performance metric and removing from consideration those servers which fall outside the significance window;

applying a second significance window to the servers remaining after applying the first significance window, the second significance window defining a range of acceptable values of the second performance metric; and identifying the best server from among any remaining servers lying within the second significance window.

23. The apparatus of claim 22, wherein the processors are configured or designed to perform the following additional operations:

obtaining values of a third performance metric for each server in the group of servers;

applying a third significance window to any remaining servers lying within the second significance window, the third significance window defining a range of acceptable values of the third performance metric; and identifying the best server from among any remaining servers lying within the third significance window.

24. The apparatus of claim 22, wherein the processors are configured or designed to perform the following additional operations:

calculating at least one of the first significance window and the second significance window.

25. The apparatus of claim 24, wherein the processors are configured or designed to perform the following additional operations:

calculating the difference between the best and worst metric values for available servers; and identifying a multiplier, wherein the product of the multiplier and the difference between the best and worst metric values yields the significance window.

26. An apparatus for selecting a server from a group of servers to provide content to a client in an optimal manner, the apparatus comprising:

means for obtaining values of at least a first performance metric and a second performance metric for each server in the group of servers, wherein the performance metrics correspond with the characteristics of transmission between the servers and network nodes associated with the client;

means for applying a first significance window defining a range of acceptable values of the first performance metric and removing from consideration those servers in the group having poor values of the first performance metric, which fall outside the significance window;

means for applying a second significance window to the servers remaining after applying the first significance window, the second significance window defining a range of acceptable values of the second performance metric; and means for identifying the best server from among any remaining servers lying within the second significance window.

27. The apparatus of claim 26, further comprising:

means for obtaining values of a third performance metric for each server in the group of servers;

means for applying a third significance window to any remaining servers lying within the second significance window, the third significance window defining a range of acceptable values of the third performance metric; and means for identifying the best server from among any remaining servers lying within the third significance window.

28. The apparatus of claim 26, further comprising means for calculating at least one of the first significance window and the second significance window.

29. The apparatus of claim 28, wherein means for calculating the at least one of the first and second significance windows comprises:

means for calculating the difference between the best and worst metric values for available servers; and means for identifying a multiplier, wherein the product of the multiplier and the difference between the best and worst metric values yields the significance window.

30. The apparatus of claim 28, wherein means for calculating the at least one of the first and second significance windows comprises:

means for providing an upper and lower bound for a significance window;

means for calculating the difference between the best and worst metric values for available servers;

means for identifying a multiplier; and means for calculating the product of the multiplier and the difference, wherein the significance window is the median of the upper bound, lower bound, and the product of the multiplier and the difference.

31. The apparatus of claim 28, wherein means for calculating the at least one of the first and second significance windows comprises:

means for providing a significance window of constant size.

32. The apparatus of claim 28, wherein means for calculating the at least one of the first and second significance windows comprises:

means for identifying a percentage of servers with metric values closest to an identified optimal value.

* * * * *